Nov. 8, 1932.   D. D. SHIERK   1,887,106
UNIVERSAL JOINT
Filed Dec. 18, 1930

Dearell D. Shierk
Inventor
Attorney.

Patented Nov. 8, 1932

1,887,106

UNITED STATES PATENT OFFICE

DEARELL D. SHIERK, OF PORTLAND, OREGON, ASSIGNOR TO MABEL L. HAMILTON, OF PORTLAND, OREGON

UNIVERSAL JOINT

Application filed December 18, 1930. Serial No. 503,223.

My invention is primarily intended for use in a shaft wherein one part of the shaft is driven out of alignment with another part of the shaft.

The invention consists primarily of a joint in which a socket is formed upon one end of the joint, a plurality of slots being disposed upon the inner surface of the socket, the other end of the shaft having a ball disposed thereupon, with a bearing disposed therein. A bearing block is slidably disposed within the ball with a reacting element disposed within the bearing to press the oppositely disposed ends of the same outwardly. A tapered bearing is disposed along the center line of each member of the bearing blocks into which a tapered stub shaft is fitted; the tapered stub shaft is adapted to engage directly within a tapered bearing disposed within each of the bearing blocks to compensate for wear as it occurs.

A bearing head is disposed upon the outer end of each of the stub shafts that are adapted to engage within the slots disposed upon the inner surface of the socket member. A hood is disposed about the outer surface of the socket member and is adapted to engage directly upon the shaft having the ball disposed thereupon.

A collar is disposed about the shaft with a reacting element disposed between the hood and the collar that is adapted to maintain a relatively tight working connection between the hood and the outer surface of the socket member. A gasket ring is disposed between the hood and socket member and between the hood and the shaft, the socket member being split to facilitate the assembly of the device.

The primary object of my invention is to provide a device adapted for automotive use.

A further object of my device consists in providing a universal joint comprised of few parts and one that may be used over relatively long operating periods with freedom from operating annoyances.

A still further object of my invention consists in providing a universal joint having means disposed therein for compensation for wear, with automatic take ups being provided as the wear occurs.

A still further object of my invention consists in providing a universal joint adapted for all forms of drives and especially for high speed drives.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing.

Like reference characters refer to like parts throughout the several views.

Figure 2:
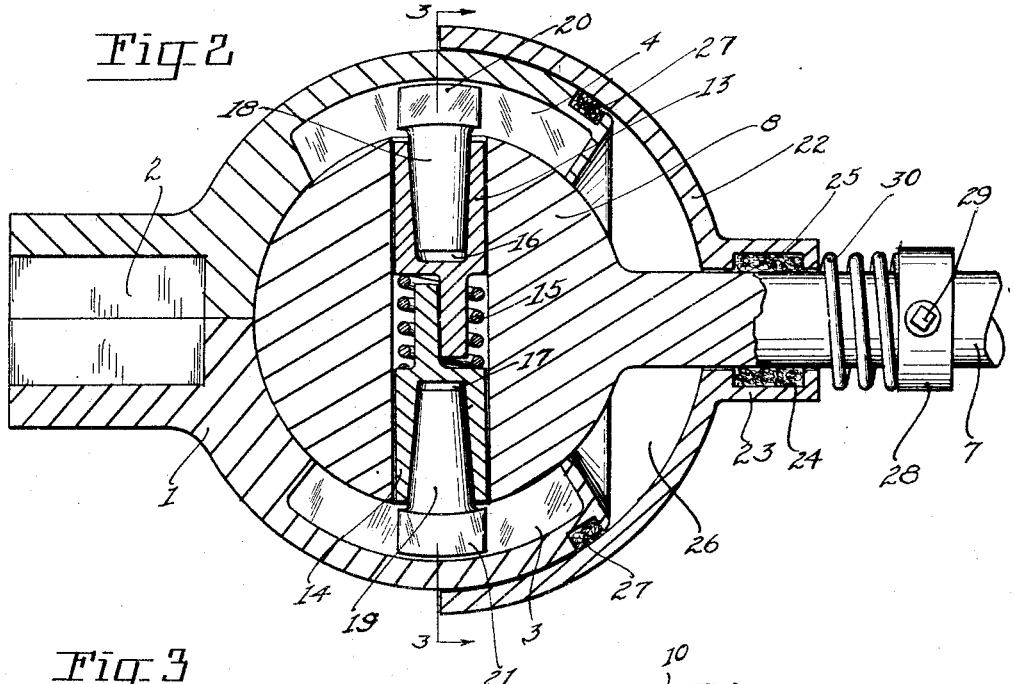
Fig. 2 is a longitudinal, sectional, side view of the assembled device.
Figure 3:
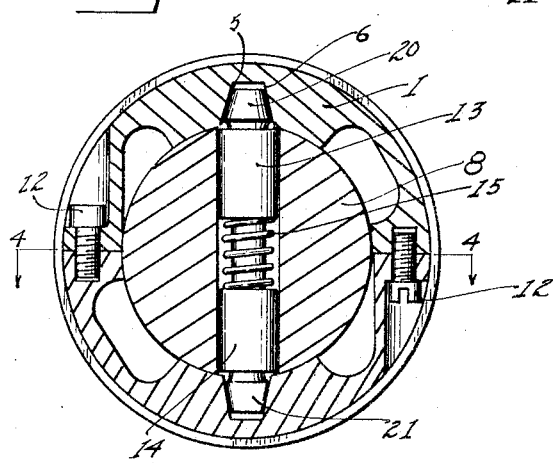
Fig. 3 is a sectional, end view of the assembled joint, the same being taken on line 3—3 of Fig. 2, looking in the direction indicated.
Figure 1:
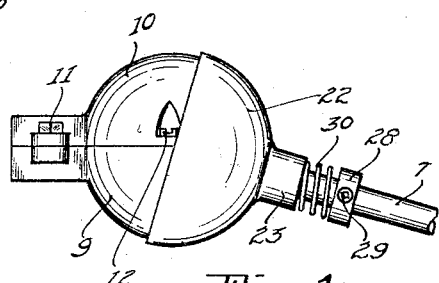
Fig. 1 is a side view of the assembled joint.
Figure 4:
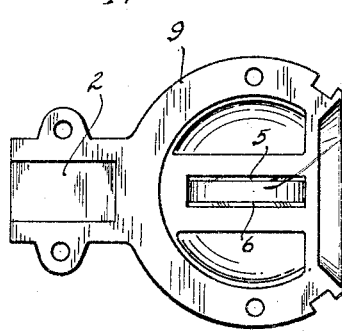
Fig. 4 is a side view, of the socket member of the joint, illustrating the same disassembled from the remainder of the structure.
Figure 5:
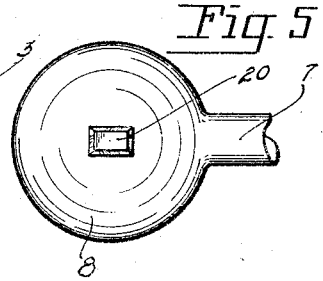
Fig. 5 is a side view of the head end, of the joint illustrating the same in position for assembly within the socket member.

I form my universal joint of a socket head 1, having a driving shaft receiving recess 2 disposed therein, the same being made of suitable cross sectional area, to receive a shaft therein. To prevent the shaft from turning in the socket 1, I have here shown the socket, or recess, as being square in cross sectional area, but I do not wish to be limited to this shape as any suitable shape may be used.

Bearing slots 3 and 4 are disposed upon the inner surface of the socket member, the slots representing segments of circles. The side walls 5 and 6 of each of the slots are made uniformly tapering. The oppositely disposed end of the joint is comprised of a shaft 7 having a ball 8 disposed upon its inner end that is adapted for being fitted directly into the spherical surfaces of the socket member 1.

The socket member is primarily comprised of two sections 9 and 10 split along their medial line and the same are secured together through the use of suitable fastening bolts 11 and 12. Bearing blocks 13 and 14 are disposed within the ball member of the joint and are adapted to having a longitudinal movement imparted thereto, through the use of reacting elements, as coil spring 15. Openings 16 and 17 are disposed within the bearing blocks. The openings are frusta-conical, to adapt the reception of tapered shafts 18 and 19 therein. The shafts 18 and 19 have heads 20 and 21 disposed upon their outer ends, the heads being adapted to precisely engage the side walls 5 and 6 of the slots 3 and 4, and as wear occurs between the heads 20 and 21 in the slots, the springs force engagement therebetween. As wear occurs upon the frusta-conical end of the tapered shafts 18 and 19 the spring forces an intimate engagement between the respective shafts and the frusta-conical bearings disposed therein; the construction thus provided prevents any loose connection developing between the respective ends of the joints.

A hood 22 has a shank 23 disposed upon its one end, that adapts the same to the shaft 7. An annular recess 24 is disposed within the shank in which a suitable packing 25 may be placed, to maintain the universal joint packed with lubricant within the spaces 26 disposed therein. A pack ring 27 is provided about the outer surface of the socket member 1 to prevent leakage of the lubricant therepast. A collar 28 is disposed about the shaft 7 and is adjustably positioned thereupon through the use of a set screw 29. A coil spring 30 is disposed between the collar 28 and the shank 23 to maintain a relatively tight connection between the hood 22 and the outer surface of the socket member 1.

While the form of mechanism herein shown and described is admirably adapted to fulfill the objects primarily stated, it is understood that it is not intended to confine the invention to the one form of embodiment herein shown and described, as it is susceptible of embodiment in various forms, all coming within the scope of the claims which follow.

What I claim is:

1. In a device of the class described, the combination of a socket member split longitudinally and adapted for being secured together by threaded members, slots disposed upon the inner surface of the socket member; a shaft having a ball, the ball of which is adapted for engagement within the socket member and to precisely fit the same; bearing blocks adjustably disposed within the ball, having a reacting element disposed therebetween for normally distending the same; frusta-conical sockets disposed within the bearing blocks, frusta-conical stub shafts adjustably disposed within the frusta-conical sockets, and heads terminating the outer ends of the frusta-conical shafts and adapted for fitting the slots disposed upon the inner surface of the socket members.

2. In a device of the class described, the combination of a ball and socket joint, slots disposed upon the inner surface of the socket member, the side walls of which are uniformly tapering, a bore disposed within the ball, bearing blocks disposed within the bore, means for outwardly extending the bearing blocks; tapered stub shafts disposed within the bearing blocks and means for maintaining a relatively tight working relationship between the head and shafts and slots, and between the tapered walls of the shafts and the bearing blocks and means for maintaining a lubricant within the assembly.

3. In a device of the class described, the combination of a split socket member and a ball and shaft adapted to having the ball precisely disposed within the split socket member when assembled; slots disposed upon the inner surface of the socket member, the side walls of which are divergent, a bore disposed within the ball, bearing blocks adjustably disposed therein; stub shafts journaled within the bearing blocks, the outer ends of which are adapted to precisely fit the diverging wall slots, a hood adjustably disposed about the shaft having the ball disposed upon one end thereof and means for maintaining a lubricant within the assembly.

DEARELL D. SHIERK.

CERTIFICATE OF CORRECTION.

Patent No. 1,887,106. November 8, 1932.

DEARELL D. SHIERK.

It is hereby certified that the above numbered patent was erroneously issued to "Mabel L. Hamilton, of Portland, Oregon," as assignee of the entire interest in said invention whereas said patent should have been issued to the inventor said "Dearell D. Shierk," as shown by the records of assignments in this office; and that the said Letters Patent should be read with this correction therein that the same may conform to the record of the case in the Patent Office.

Signed and sealed this 1st day of August, A. D. 1933.

M. J. Moore.

(Seal) Acting Commissioner of Patents.